Patented Sept. 29, 1942

2,297,033

UNITED STATES PATENT OFFICE 2,297,033

LUMINESCENT COMPOSITION

Paul Stahr, Long Beach, N. Y., assignor of fifty per cent to Albert E. Schwartz, New York, N. Y.

No Drawing. Application October 1, 1941, Serial No. 413,193

9 Claims. (Cl. 250—81)

This invention is directed to compositions particularly adapted for the production of artistic paintings, and more particularly to compositions which when subjected to ultra-violet light, produce characteristic fluorescent effects.

Substances which fluoresce have long been known, such substances being both inorganic and organic. It has been customary to use such materials in various compositions, as for example in a mixture of inorganic materials in order to produce a desired color of light in an electric illuminating tube. Other compositions, particularly of inorganic materials, have been used as screens for the production of X-ray photographs and the like. Various fluorescent materials have been used on fabrics to impregnate the same and thus give desired fluorescent effects; but as far as applicant can determine, no one has successfully used such compositions for the production of artistic tone paintings.

Accordingly, it is among the objects of the present invention to provide compositions which may be used in the production of artistic paintings, which will be relatively simple to manufacture, which will be permanent in character, and which will give desired fluorescent effects.

It is also among the objects of the present invention to provide a composition which, upon being subjected to ultra-violet light rays, will produce fluorescence such that even the most delicate of tints in the painting will become clearly discernible and in which gradations of tints incident to the artistic effort in producing the painting will be accentuated.

It is still further among the objects of the invention to provide compositions and resulting artistic paintings wherein the final products have a life-like quality and appear to be three-dimensional in appearance when subjected to ultra-violet light.

In practicing the present invention, I provide a carrier and activator which is the principal ingredient of the composition, and consists essentially of an organic material which is relatively water-insoluble, which provides a substantially pure white background, and which is substantially opaque to ultra-violet rays. The said substance should be colloidal in nature and be non-crystalline in order that it may spread readily and smoothly in the painting operations. I have found that all the various starches and starch-like materials are eminently suitable for the purpose, since they have the above-mentioned properties. In addition, the starches may be mixed with water to form smooth-flowing compositions, either in paste form or in semi-liquid or even in liquid form, so that various types of painting may be accomplished with a base of this character with equal facility.

The starch-like paste is mixed with a sufficient amount of water to give the desired viscosity of composition, and to the same is added a suitable dye which is capable of imparting fluorescent properties when suitably mixed and associated with the starch material. The dyes need not necessarily be fluorescent in themselves, and, in fact, in most cases are non-fluorescent when in the pure state. The amount of dye is extremely small compared to the starch and a sufficient amount is added thereto and uniformly incorporated therein to give the desired color and fluorescent effect. Applicant has found that only a small amount of the dye is necessary and that after a certain saturation point of dye present has been reached, additional amounts of dye do not have any additional effects. Therefore, in order to obtain a composition of the desired tint, a small amount of dye, ranging from an infinitesimal amount up to the maximum, which is usually a fraction of a percent of the amount of starch, is added thereto.

Apparently the starch is not only a vehicle for the dye, but also appears to be an activator, in that the dye not having fluorescent properties in the pure state, now, by reason of its association with the starch, becomes fluorescent under ultra-violet light.

Since a composition of this type after it has been placed upon a painting and allowed to dry is not sufficiently coherent to remain permanently in place and is likely to be rubbed off by friction or other contact, there is added to the composition a binder, which preferably is a water-miscible substance tending to hold the particles of starch and dye in their proper relative positions on the background, and thus prevents the composition from dusting and being removed from the background. The binder is preferably water-miscible and usually has emulsifying properties. By reason thereof, the binder mixes perfectly with the water suspension of the starch and aids in providing a smooth composition which will be suitable for the painting operations.

In some cases, it may be desirable to add to the composition, either with or without the aforesaid binder, a film-forming composition which may be a lacquer base. A relatively small amount of such a composition dissolved in an organic solvent may be added to the starch composition and intimately mixed therewith. If such film-forming material is not readily miscible with the starch-water combination, a suitable wetting agent in small amount may be added whereby unity of composition is obtained. By reason of such addition, the particles of starch are permanently held together and held upon the background, and at the same time a water-proofness is obtained which will render the painting resistant to weathering. In addition thereto, or in place of the film-forming composition, the completed painting may be given a thin coat of the film-forming material in order to insure that the same is resistant to weather.

The following examples will illustrate several compositions coming within the scope of the present invention:

Example I 100 grams of tapioca starch is ground to a suitable degree of fineness and is mixed with a sufficient amount of water to make a thick paste. 0.1 gram of uranine, a yellow dye which is capable of fluorescing when mixed with the starch, is provided in a saturated solution in water. This is added to the starch paste mixture and by vigorously stirring is uniformly incorporated therein. Thereafter, 5 grams of gum arabic mixed with a small amount of water to wet the same is stirred into the mixture until the whole is a homogeneous mass.

The composition is used in the same manner as ordinary oil paint and an artistic painting is made on a base with this composition and also with other compositions to give different colors. The painting is allowed to dry and it is given a coating of a lacquer consisting essentially of cellulose nitrate and dibutylphthalate in a solvent of acetone and isopropyl alcohol.

When a painting of this type is viewed in daylight, it appears as the ordinary two-dimensional painting. The colors appear in their normal state and there is nothing unusual about the appearance. If, however, in place of daylight the painting is subjected to ultra-violet rays, a complete transformation in the appearance occurs. Each of the parts of the painting now stands out away from the canvas or other background, and the various elements of the painting appear to be life-like and a definite three-dimensional effect is obtained. In most cases, the background seems to take the proper atmospheric plane and the painting seems to be entirely natural and lifelike.

Example II

A paste is made with rice starch and water, in the same manner as set forth in Example I. To this mixture is added 0.2 gram of rhodamine dye in the dry state, being incorporated in the starch mixture by vigorous stirring. 10 grams of gum tragacanth are made into a paste with water and added to the rice paste and suitably incorporated therein. The composition is then thinned with water to make a free-flowing material and it is painted onto a photograph taken on suitable photographic paper. The composition is applied to those portions of the photograph which it is desired to color. As a result, the photograph on being subjected to daylight appears as the ordinary colored photograph, but when subjected to ultra-violet rays, fluoresces and gives a definite three-dimensional effect. If the photograph is of a person, he stands out from the background and appears very life-like.

Example III

A similar mixture of corn starch and water is made as set forth in Example I. To this is added 0.01 gram of carbon blue and 8 grams of dextrine. To the composition is added 3 grams of cellulose acetate dissolved in acetone and the composition is diluted with water to a consistency such that it flows readily. Small or large pieces of paper are dipped therein and allowed to dry. These pieces of paper are of a size similar to snow flakes and the product may be distributed in a steady falling stream in ultra-violet light to give the effect of snow falling for display purposes.

Example IV

A mixture is made of 80 grams of sago starch and a sufficient amount of water to form a smooth paste. Then there is added 0.1 gram of thioflavine S, primoline, 15 grams of fish glue, and 1.0 gram of lauryl sulphate. The ingredients are intimately mixed and the composition is diluted with sufficient water to provide a consistency suitable for brushing. Then 20 grams of titanium oxide is incorporated in the mixture.

Compositions of this type give effects not heretofore obtained. When subjected to ultra-violet light, the light is transformed at the surface of the painting and the reflection of the light is in the form of fluorescent rays. The starch base of the composition is substantially opaque and is a pure white, so that the reflection of the fluorescent rays from the surface thereof gives a brilliant effect. It also enables very fine tints to be reflected to give the desired three-dimensional effects.

Many uses are possible of the present invention, including those set forth in the above examples. One may also apply such compositions to paintings made with ordinary colors in order to give the additional effects. For display purposes, one may make a dry composition of the starch and the dye and sprinkle the same over surfaces to be emphasized, as for instance for display windows, whereupon by subjecting the ultra-violet rays, beautiful decorative effects are obtained. Also, for display purposes, mannikins may be painted in whole or in part with compositions of the present invention, and the clothing of such mannikins may also be painted for similar effects. These are only a few illustrations of the many uses to which the present invention may be adapted.

There are numerous advantages inherent in the present invention. The compositions may be stored in the dry state for an indefinite period of time, and when it is desired to use the same, it is merely necessary to mix with water to obtain the desired consistency for application. If a mixed fluid composition accidentally dries, it may be restored to its original consistency by the addition of water.

After the composition has been applied to the subject, it may be removed in whole or in part merely by washing, and it is susceptible of blending with compositions of different colors to give desired effects, and in the same manner as is accomplished by the use of oil paints. The washing of brushes used with the present composition is quite simple, as the entire mixture is miscible with water, and brushes, even though the composition has dried thereon, may be quickly and easily cleaned. It may be applied in any desired manner, since it is miscible with various color varnishes, and the application to printed or mat surfaces is relatively simple. It may be applied in the viscous state and then thinned by using water on the brush, or in any other suitable manner.

I am aware that lacquer compositions made, for example, with cellulose acetate or nitrate and containing fluorescent materials are known. However, such compositions are far inferior to those of the present invention in many respects. For instance, it is not possible with the prior art to obtain delicate tints when viewed under ultra-violet light. In the application of prior art compositions, the drying thereof is quite rapid because of evaporation of a solvent and it is impossible to go over a painted surface in order to correct the same. Also, it is impossible to spread the composition to give the effect of depth, as is possible in the present invention.

The prior art compositions when viewed in daylight do not show natural effects, since the colors tend to fade out in daylight and it is only by the use of ultra-violet light in the absence of daylight that the fluorescent substances become visible. In the present invention, on the other hand, the colors are readily visible by daylight and added effects are obtained when subjected to ultra-violet rays. In the prior art it was necessary to remove from the ultra-violet all other rays, necessitating the use of color filters. This resulted in cutting down the amount of light, and therefore high intensity sources of ultra-violet had to be used if various effects were to be obtained. The prior art compositions were such that the blending of two colors on the subject was not visible. Also, the number of colors which could be used was extremely limited, contrary to the present invention. If a color was applied to the subject, it was thereafter impossible to wash the same out without destroying the subject.

Although I have described my invention setting forth a few embodiments thereof, the invention is not to be limited to such embodiments as they have been inserted only for illustrative purposes. For instance, the medium on which the painting is produced may be not only those materials mentioned above, but various others, such as silk, muslin, metal, paper, wood, glass, tile, and the like. The dyes set forth above are but a small number of a very large group which are adaptable for the purpose. Among such other dyes as may be used are aniline blue, fusine, quinoline yellow, uranine, rhodamine, prinoline, in addition to many others. Also, if desired, pigments capable of developing fluorescent properties may be added in small amount to the compositions. Also, various other constituents may be added to the compositions of the present invention to impart other desired properties thereto, as is well known.

Paintings made in accordance with the present invention appear in daylight as normal paintings, but under the activation or application or ultra-violet light, assume entirely different aspects and fluoresce to give third dimensional effects. The invention is applicable not only to original paintings, but also to existing paintings, photographs, or other embellishments superimposed on sheets by photography, lithography, painting, or any other process. The material may be applied to the painting by air brush, spray, brushing, and any of the other methods usual in this art. Phosphorescent materials may be incorporated into the composition. Various uses are inherent in the present compositions as set forth above, and also other uses such as for coloring water for obtaining fountain effects by ultra-violet rays.

In the claims, reference to "starch-like material" is intended to include the true starches as well as other materials having a starch-like character capable of giving the effects of the starches as set forth herein. By "artistic" paintings, as set forth herein, there is included not only such paintings which are of value only for their artistic quality, but also those which are used commercially where it is desired to obtain the desired effects for display purposes.

What I claim is:

1. A composition for artistic painting comprising a starch-like material which is non-crystalline and has a substantially pure white opaqueness, an amount of water intimately mixed therewith sufficient to provide a fluid composition adapted for spreading to give artistic effects, and a dye in an amount which is less than 1% relative to said material, the latter being an activator for said dye to cause the same to fluoresce under ultraviolet light projected onto said painting.

2. A composition for artistic painting comprising a starch-like material which is non-crystalline and has a substantially pure white opaqueness, an amount of water intimately mixed therewith sufficient to provide a fluid composition adapted for spreading to give artistic effects, and a dye in small proportion relative to said material, the latter being an activator for said dye to cause the same to fluoresce under ultra-violet light projected onto said painting, said material being sufficiently opaque so that ultra-violet rays impinging on the surface thereof are substantially completely reflected therefrom in the form of fluorescence.

3. A composition for artistic painting comprising an undegenerated substantially water-miscible starch material which is non-crystalline and has a substantially pure white opaqueness, an amount of water intimately mixed therewith sufficient to provide a fluid composition adapted for spreading to give artistic effects, and a dye in small proportion relative to said material, the latter being an activator for said dye to cause the same to fluoresce under ultra-violet light projected onto said painting.

4. A composition for artistic painting comprising a starch-like material which is non-crystalline and has a substantially pure white opaqueline, an amount of water intimately mixed therewith sufficient to provide a fluid composition adapted for spreading to give artistic effects, and a dye in small proportion relative to said material, the latter being an activator for said dye to cause the same to fluoresce under ultra-violet light projected onto said painting, and a substantial amount of an organic binder uniformly distributed throughout said composition to prevent dusting thereof after said composition has been applied and dried.

5. A composition for artistic painting comprising a starch-like material which is non-crystalline and has a substantially pure white opaqueness, an amount of water intimately mixed therewith sufficient to provide a fluid composition adapted for spreading to give artistic effects, and a dye in small proportion relative to said material, the latter being an activator for said dye to cause the same to fluoresce under ultra-violet light projected onto said painting, and a substantial amount of an organic binder uniformly distributed throughout said composition to prevent dusting thereof after said composition has been applied and dried, said binder being water-miscible and having wetting properties.

6. A composition for artistic painting comprising a starch-like material which is non-crystalline and has a substantially pure white opaqueness, an amount of water intimately mixed therewith sufficient to provide a fluid composition adapted for spreading to give artistic effects, and a dye in small proportion relative to said material, the latter being an activator for said dye to cause the same to fluoresce under ultra-violet light projected onto said painting, and a substantial amount of an organic binder uniformly distributed throughout said composition to prevent dusting thereof after said composition has been applied and dried, a water-resistant film-forming substance in small proportion mixed with said composition and adapted to weatherproof said painting.

7. An artistic painting comprising a background of a fabric, paper, or other sheet material having on the surface thereof a subject painted with a starch-like material which is non-crystalline and has a substantially pure white opaqueness, an amount of water intimately mixed therewith sufficient to provide a fluid composition adapted for spreading to give artistic effects, and a dye in small proportion relative to said material, the latter being an activator for said dye to cause the same to fluoresce under ultra-violet light projected onto said painting.

8. An artistic painting comprising a background of a fabric, paper, or other sheet material having on the surface thereof a subject placed thereon as a photographic film and having superimposed on said film over at least a part thereof a composition of a starch-like material which is non-crystalline and has a substantially pure white opaqueness, an amount of water intimately mixed therewith sufficient to provide a fluid composition adapted for spreading to give artistic effects, and a dye in small proportion relative to said material, the latter being an activator for said dye to cause the same to fluoresce under ultra-violet light projected onto said painting.

9. An artistic painting comprising relatively small pieces of paper covered with a composition of a starch-like material which is non-crystalline and has a substantially pure white opaqueness, an amount of water intimately mixed therewith sufficient to provide a fluid composition adapted for spreading to give artistic effects, and a dye in small proportion relative to said material, the latter being an activator for said dye to cause the same to fluoresce under ultra-violet light projected onto said painting.

PAUL STAHR.